(12) United States Patent
Jung et al.

(10) Patent No.: US 10,484,687 B2
(45) Date of Patent: Nov. 19, 2019

(54) METHOD AND APPARATUS FOR IMAGE ENCODING AND DECODING

(71) Applicant: Electronics and Telecommunications Research Institute, Daejeon (KR)

(72) Inventors: Soon Heung Jung, Daejeon (KR); Myung Seok Ki, Daejeon (KR); Hui Yong Kim, Daejeon (KR); Joo Young Lee, Daejeon (KR); Se Yoon Jeong, Daejeon (KR); Jin Soo Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 15/870,230

(22) Filed: Jan. 12, 2018

(65) Prior Publication Data

US 2018/0288417 A1 Oct. 4, 2018

(30) Foreign Application Priority Data

Apr. 4, 2017 (KR) ........................ 10-2017-0043678

(51) Int. Cl.
| | |
|---|---|
| *H04N 19/132* | (2014.01) |
| *H04N 19/91* | (2014.01) |
| *H04N 19/172* | (2014.01) |
| *H04N 19/59* | (2014.01) |
| *H04N 19/137* | (2014.01) |
| *H04N 19/154* | (2014.01) |
| *H04N 19/587* | (2014.01) |

(52) U.S. Cl.
CPC ......... *H04N 19/132* (2014.11); *H04N 19/137* (2014.11); *H04N 19/154* (2014.11); *H04N 19/172* (2014.11); *H04N 19/587* (2014.11); *H04N 19/59* (2014.11); *H04N 19/91* (2014.11)

(58) Field of Classification Search
CPC .... H04N 19/103; H04N 19/11; H04N 19/132; H04N 19/91; H04N 19/172; H04N 19/59; H04N 19/137; H04N 19/154; H04N 19/587
USPC ........................................ 375/240.02, 240.03
See application file for complete search history.

(56) References Cited

U.S. PATENT DOCUMENTS

| 10,187,641 B2 * | 1/2019 | Lee ...................... H04N 19/159 |
| 2014/0119441 A1 | 5/2014 | Lee et al. |
| 2014/0211861 A1 | 7/2014 | Lee et al. |

FOREIGN PATENT DOCUMENTS

| KR | 10-2002-0070198 A | 9/2002 |
| KR | 10-2009-005166 A | 5/2009 |

* cited by examiner

*Primary Examiner* — Dominic D Saltarelli
(74) *Attorney, Agent, or Firm* — NSIP Law

(57) ABSTRACT

Disclosed is a method and apparatus for encoding/decoding an image. The image encoding apparatus according to an embodiment of the present disclosure may include: an encoding level decision unit determining an encoding level of an input image; a sampling unit outputting an encoding target picture associated with the encoding level determined in the encoding level decision unit; an encoding unit encoding the encoding target picture output from the sampling unit; a reference picture storage unit storing at least one reference picture; and a reconstructed image generation unit generating a reconstructed image corresponding to the input image in association with the encoding level determined in the encoding level decision unit.

17 Claims, 10 Drawing Sheets

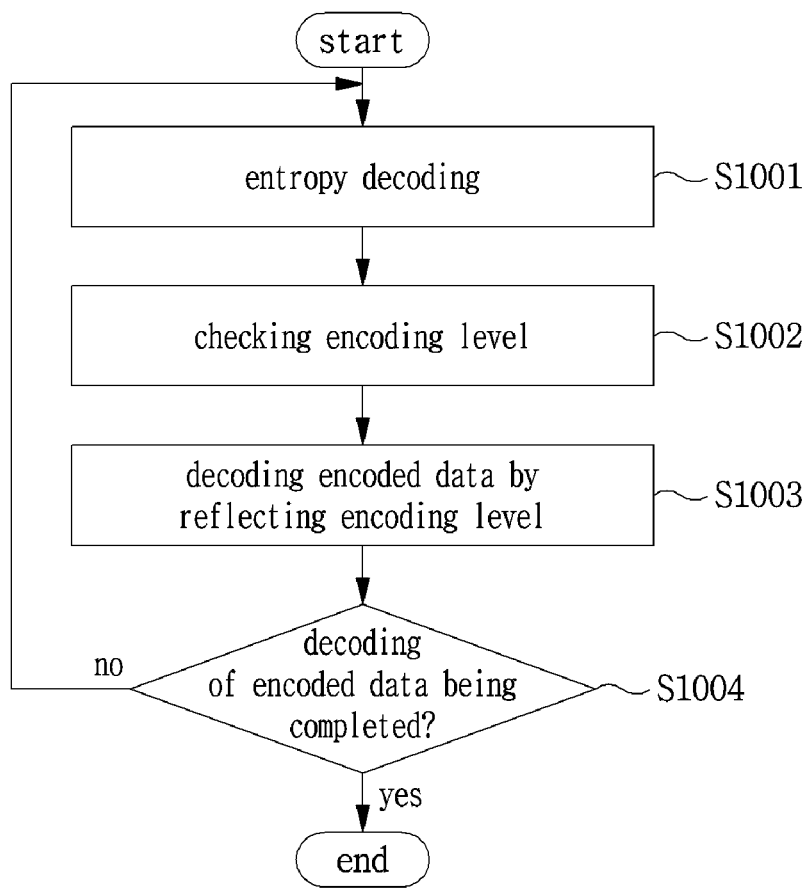

METHOD AND APPARATUS FOR IMAGE ENCODING AND DECODING

CROSS REFERENCE TO RELATED APPLICATION

The present application claims priority to Korean Patent Application No. 10-2017-0043678, filed Apr. 4, 2017, the entire contents of which is incorporated herein for all purposes by this reference.

BACKGROUND OF THE INVENTION

Field of the Invention

The present invention relates generally to a method and apparatus for encoding and decoding an image. More particularly, the present invention relates to a method and apparatus for encoding and decoding an image considering temporal/spatial resolutions.

Description of the Related Art

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compressing techniques include various techniques such as an inter prediction technique of predicting pixel values included in a current picture from previous or following pictures of the current picture, an intra prediction technique of predicting pixel values included in a current picture using pixel information in the current picture, and an entropy encoding technique of assigning a short code to a value with a high appearance frequency and assigning a long code to a value with a low appearance frequency. Image data may be effectively compressed and transferred or stored using such image compressing techniques.

Furthermore, together with an increase in demand for a high-resolution image, a demand for stereographic image content as a new image service has also increased. A video compression technique for effectively providing such stereographic image content with high resolution and ultra-high resolution images is being discussed.

The foregoing is intended merely to aid in the understanding of the background of the present invention, and is not intended to mean that the present invention falls within the purview of the related art that is already known to those skilled in the art.

SUMMARY OF THE INVENTION

A technical problem of the present disclosure is to provide a method and apparatus for encoding and decoding an image by adaptively skipping a frame and transforming a spatial resolution.

Another technical problem of the present disclosure is to provide a method and apparatus for encoding and decoding an image whereby image quality is not degraded even though the image is reconstructed from encoded data obtained by adaptively skipping the frame and transforming the spatial resolution.

Another technical problem of the present disclosure is to provide a method and apparatus for encoding and decoding an image whereby an amount of encoded data is remarkable reduced by encoding data after adaptively skipping the frame and transforming the spatial resolution.

Technical problems obtainable from the present disclosure are non-limited by the above-mentioned technical task problems. In addition, other unmentioned technical problems can be clearly understood from the following description by those having ordinary skill in the technical field to which the present disclosure pertains.

According to one aspect of the present disclosure, there may be provided an image encoding apparatus. The image encoding apparatus may include: an encoding level decision unit determining an encoding level of an input image; a sampling unit outputting an encoding target picture associated with the encoding level determined in the encoding level decision unit; an encoding unit encoding the encoding target picture output from the sampling unit; a reference picture storage unit storing at least one reference picture; and a reconstructed image generation unit generating a reconstructed image corresponding to the input image in association with the encoding level determined in the encoding level decision unit.

According to one aspect of the present disclosure, there may be provided an image decoding apparatus. The image decoding apparatus may include: an entropy decoding unit reconstructing encoded image data from a bitstream; an encoding level check unit checking an encoding level of the encoded image data; a sampling unit outputting encoded data associated with the encoding level determined in the encoding level check unit; a decoding unit decoding the encoded data output from the sampling unit; a reference picture storage unit storing at least one reference picture; and a reconstructed image generation unit generating a reconstructed image included in the output image in association with the encoded level checked in the encoding level check unit.

According to one aspect of the present disclosure, there may be provided an image encoding method. The image encoding method may include: determining an encoding level of an input image; outputting an encoding target picture associated with the determined encoding level; encoding the encoding target picture; storing at least one reference picture generated or reconstructed when encoding the encoding target picture; and generating a reconstructed image corresponding to the input image in association with the encoding level.

According to one aspect of the present disclosure, there may be provided an image decoding method. The image decoding method may include: checking an encoding level of encoded image data; outputting encoded data associated with the determined encoding level; decoding the output encoded data; storing at least one reference picture generated or reconstructed when decoding the output encoded data; and generating a reconstructed image included in the output image in association with the encoding level checked by an encoding level check unit.

The above briefly summarized features of the present disclosure are merely illustrative aspects of the detailed description of the disclosure that follows and do not limit the scope of the present disclosure.

According to the present disclosure, there may be provided a method and apparatus for encoding and decoding an image by adaptively skipping a frame and transforming a spatial resolution.

In addition, according to the present disclosure, there may be provided a method and apparatus for encoding and decoding an image whereby image quality is not degraded even though the image is reconstructed from encoded data obtained by adaptively skipping the frame and transforming the spatial resolution.

In addition, according to the present disclosure, there may be provided a method and apparatus for encoding and decoding an image whereby an amount of encoded data is remarkable reduced by encoding data after adaptively skipping the frame and transforming the spatial resolution Effects obtainable from the present disclosure are non-limited by the above mentioned effect. Further, other unmentioned effects can be clearly understood from the following description by those having ordinary skill in the technical field to which the present disclosure pertains.

BRIEF DESCRIPTION OF THE DRAWINGS

The above and other objects, features and other advantages of the present invention will be more clearly understood from the following detailed description when taken in conjunction with the accompanying drawings, in which:

FIG. 10 is a flowchart showing a sequence of an image decoding method according to an embodiment of the present disclosure.

DETAILED DESCRIPTION OF THE INVENTION

Figure 1:
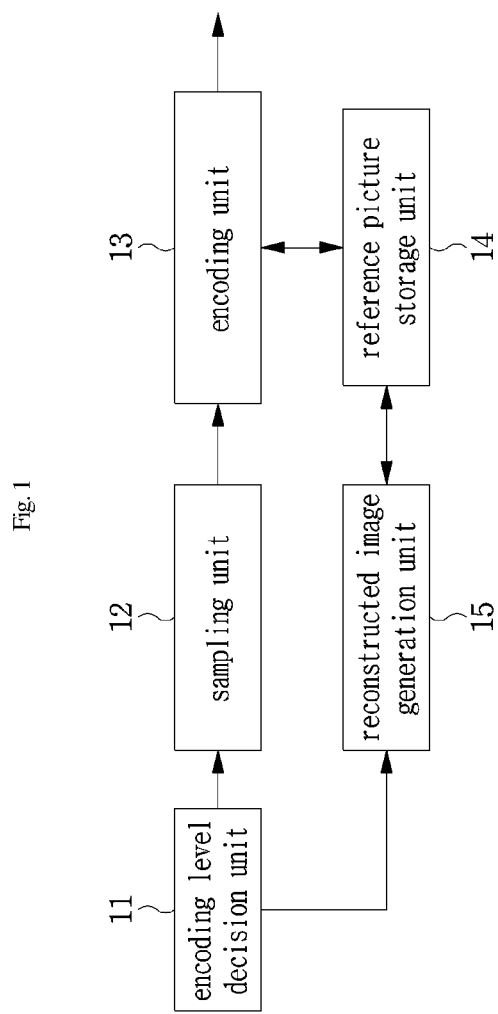
FIG. 1 is a block diagram showing a configuration of an image encoding apparatus according to a first embodiment of the present disclosure.

Hereinbelow, embodiments of the present disclosure will be described in detail so that those skilled in the art can easily carry out the present disclosure referring to the accompanying drawings. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure unclear. Parts not related to the description of the present disclosure in the drawings are omitted, and similar parts are denoted by similar reference numerals.

In the present disclosure, when an element is referred to as being "connected", "coupled", or "connected" to another element, it is understood to include not only a direct connection relationship but also an indirect connection relationship. Also, when an element is referred to as "containing" or "having" another element, it means not only excluding another element but also further including another element.

In the present disclosure, the terms first, second, and so on are used only for the purpose of distinguishing one element from another, and do not limit the order or importance of the elements unless specifically mentioned. Thus, within the scope of this disclosure, the first component in an embodiment may be referred to as a second component in another embodiment, and similarly a second component in an embodiment may be referred to as a first component in another embodiment.

In the present disclosure, components that are distinguished from one another are intended to clearly illustrate each feature and do not necessarily mean that components are separate. That is, a plurality of components may be integrated into one hardware or software unit, or a single component may be distributed into a plurality of hardware or software units. Accordingly, such integrated or distributed embodiments are also included within the scope of the present disclosure, unless otherwise noted.

In the present disclosure, the components described in the various embodiments do not necessarily mean essential components, but some may be optional components. Accordingly, embodiments consisting of a subset of the components described in an embodiment are also included within the scope of this disclosure. Also, embodiments that include other components in addition to the components described in the various embodiments are also included in the scope of the present disclosure.

Hereinbelow, exemplary embodiments of the present disclosure will be described in detail with reference to the accompanying drawings.

FIG. 1 is a block diagram showing a configuration of an image encoding apparatus according to a first embodiment of the present disclosure. Referring to FIG. 1, an image encoding apparatus 10 according to the first embodiment of the present disclosure may include an encoding level decision unit 11, a sampling unit 12, an encoding unit 13, a reference picture storage unit 14, and a reconstructed image generation unit 15.

First, an input image may be configured with a preset frame rate and a preset resolution, and the encoding level decision unit 11 may determine an encoding level of the input image by controlling a frame rate or resolution of the input image.

For example, the encoding level decision unit 11 may determine whether or not to skip at least one of a plurality of frames that are temporally consecutive in the input image, or determine whether or not to skip a pixel positioned at each preset distance unit within a frame of the input image.

The encoding level decision unit 11 may determine the encoding level of the input image based on a quality of an image reconstructed from data encoded with a frame included in the input image being skipped, a similarity between frames included in the input image, a quality of an image reconstructed from encoded data in which a resolution of the input image is down-sampled, and a similarity between the image that is obtained by down-sampling the resolution of the input image, and the input image. For example, the encoding level may be determined by comparing the quality of the image reconstructed from data encoded with the frame included in the input image being skipped with a preset threshold value (quality threshold value), or by comparing the quality of the image reconstructed from data encoded in which a resolution of the input image is down-sampled by a preset threshold value (quality threshold value). Alternatively, as another example, the encoding level may be determined by comparing the quality of the image reconstructed from data encoded with the frame included in the input image being skipped with a quality of an image reconstructed from encoded data of the input image, and by selecting the quality that is relatively higher therebetween. Similarly, the encoding level may be determined by comparing the quality of the image reconstructed from data encoded with the frame included in the input image being skipped with the quality of the image reconstructed from encoded data in which the resolution of the input image is down-sampled, and by considering the quality that is highest quality.

The encoding level decision unit 11 may provide to the encoding unit 13 information indicating the encoding level so that the encoding unit 13 may encode the information indicating the encoding level when encoding the encoding target picture.

The encoding level decision unit 11 may provide the information indicating the encoding level to the sampling unit 12, and the sampling unit 12 may detect the encoding target picture based on the information indicating the encoding level, and provide the detected encoding target picture to the encoding unit 13.

For example, when the information indicating the encoding level includes information indicating whether or not at least one of a plurality frames that are temporally consecutive is skipped, the sampling unit 12 may detect remaining frames, except for the skipped frame, and provide the detected frames to the encoding unit 13. In addition, when the information indicating the encoding level includes information of an image with a resolution thereof changed into a preset unit, the sampling unit 12 may detect the image that is obtained by down-sampling the input image in the preset unit, and provide the detected image to the encoding unit 13.

The encoding unit 13 may encode the encoding target picture provided by the sampling unit 12. The encoding unit 13 may process a conventional operation of image encoding. For example, the encoding unit 13 may partition the encoding target picture into at least one process unit (for example, prediction unit (PU), transform unit (TU), coding unit (CU)), and perform operations such as inter-prediction, intra-prediction, transform, quantization, re-arrangement, and entropy encoding of an image of the process unit.

In addition, the encoding unit 13 may configure a reference picture by processing operations such as dequantization, reverse-transform, filtering, etc., store the reference picture in the reference picture storage unit 14, and use the reference picture when encoding the encoding target picture according to the need.

The encoding target picture may include an image that is included in the input image and which has a predetermined skipped frame, or an image that is obtained by down-sampling a frame of the input image in the preset resolution.

In addition, when encoding the encoding target picture by the encoding unit 13, pixel color information a region that is not present due to the skipped frame or down-sampling may be required. Accordingly, the reconstructed image generation unit 15 may generate a reconstructed image including the pixel color information of the region that is not present due to the skipped frame or down-sampling, and store the generated reconstructed image in the reference picture storage unit 14.

For example, an image obtained by duplicating an encoding target picture that is temporally adjacent to the skipped frame and which is previously encoded, a duplicated image obtained by considering a temporal relationship between at least two encoding target pictures that are temporally adjacent to the skipped frame, a down-sampled image on which the preset resolution is reflected, an up-sampled image on which the preset resolution is reflected, etc. may be generated as the reconstructed image by the reconstructed image generation unit 15.

Meanwhile, the encoding unit 13 may encode the information indicating the encoding level, the information indicating the encoding level may be included in a field of a sequence parameter set, and a picture parameter set.

The information indicating the encoding level may indicate whether or not a frame is skipped.

The information indicating the encoding level may indicate whether or not an image resolution is changed.

In addition, the information indicating the encoding level may include information indicating whether or not a frame is skipped, or whether or not an image resolution is changed.

When the information indicating the encoding level indicates whether or not a frame is skipped, the information indicating the encoding level may include information capable of predicting the skipped frame.

The information capable of predicting the skipped frame may include a frame rate of the input image and a frame rate of the encoding target picture.

When the information indicating the encoding level indicates whether or not an image resolution is changed, the information indicating the encoding level may include information capable of reconstructing the changed resolution.

The information capable of reconstructing the changed resolution may include resolution information of the input image and resolution information of the encoding target picture.

Figure 2:
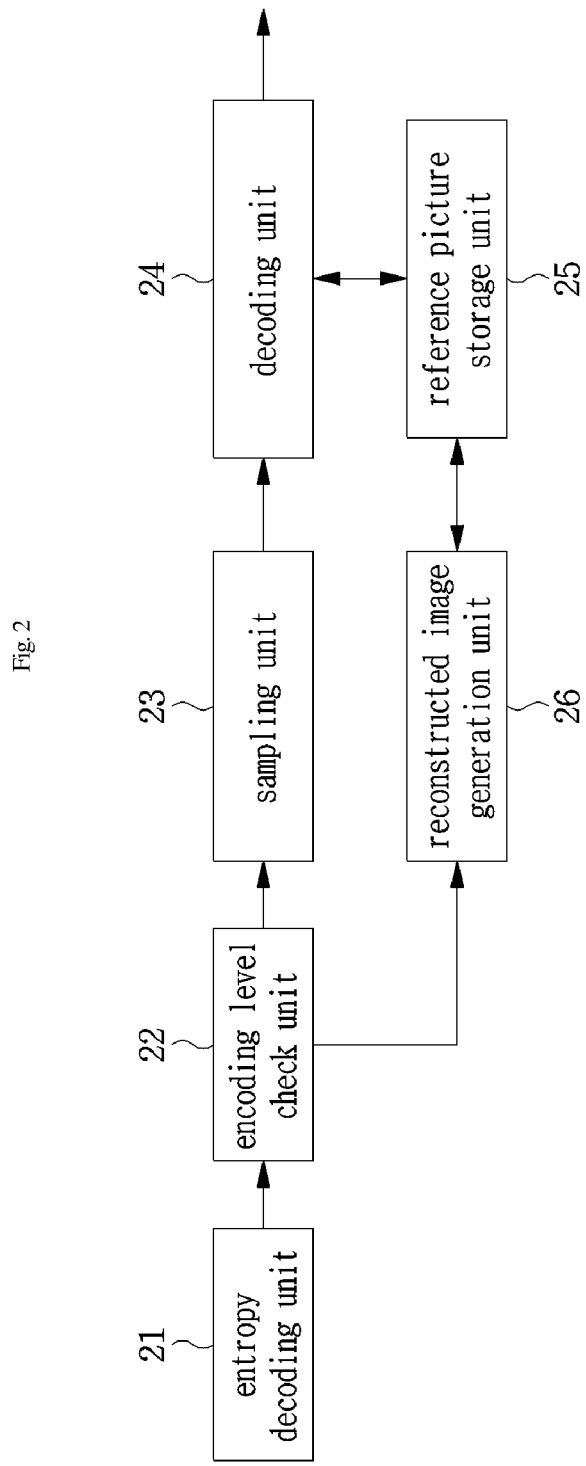
FIG. 2 is a block diagram showing a configuration of an image decoding apparatus according to a first embodiment of the present disclosure.

FIG. 2 is a block diagram showing a configuration of an image decoding apparatus according to a first embodiment of the present disclosure. Referring to FIG. 2, an image decoding apparatus 20 according to an embodiment of the present disclosure may include an entropy decoding unit 21, an encoding level check unit 22, a sampling unit 23, a decoding unit 24, a reference picture storage unit 25, and a reconstructed image generation unit 26.

The entropy decoding unit 21 may perform entropy decoding in the opposite procedure to entropy encoding performed in the entropy encoding unit of the image encoding apparatus. For example, various methods such as exponential golomb, context-adaptive variable length coding (CAVLC), context-adaptive binary arithmetic coding (CABAC) may be applied in response to a method performed in the image encoding apparatus.

The encoding level check unit 22 may check information indicating an encoding level from entropy decoded data.

The information indicating the encoding level may be included in a field of a sequence parameter set and a picture parameter set, and the encoding level check unit 22 may check the information indicating the encoding level from information included in the field of the sequence parameter set, or the picture parameter set.

The encoding level check unit 22 may check whether or not the information indicating the encoding level indicates whether or not a frame is skipped.

Alternatively, the encoding level check unit 22 may check whether or not the information indicating the encoding level indicates whether or not an image resolution is changed.

Alternatively, the encoding level check unit 22 may check whether or not the information indicating the encoding level indicates whether or not a frame is skipped, or whether or not an image resolution is changed.

According to whether or not a frame is skipped indicated by the information indicating the encoding level, the encoding level check unit 22 may further check information capable of predicting the skipped frame. The encoding level check unit 22 may check a frame rate of an input image and a frame rate of an encoding target picture as the information capable of predicting the skipped frame.

According to whether or not an image resolution is changed indicated by the information indicating the encoding level, the encoding level check unit 22 may check information capable of reconstructing the changed resolution which is indicated by the information indicating the encoding level.

The encoding level check unit 22 may check resolution information of the input image and resolution information of the encoding target picture.

The information indicating the encoding level which is checked in the encoding level check unit 22 may be provided to the sampling unit 23, the decoding unit 24, and the reconstructed image generation unit 26.

The sampling unit 23 may provide encoded data associated with the encoding level to the decoding unit 24, and the decoding unit 24 may decode the encoded data.

The encoded data may be data obtained by encoding the encoding target picture, and the encoding target picture may include an image included in the input image and which has a predetermined skipped frame, or an image obtained by down-sampling a frame of the input image in a preset resolution. In addition, when decoding the encoding target picture by the decoding unit 24, pixel color information of a region that is not present due to the skipped frame or down-sampling may be required.

Accordingly, in response to the encoding level, the reconstructed image generation unit 26 may generate a reconstructed image including pixel color information of the region that is not present due to the skipped frame or down-sampling, and store the generated reconstructed image in the reference picture storage unit 25.

For example, an image obtained by duplicating an encoding target picture that is temporally adjacent to the skipped frame and which is previously encoded, a duplicated image obtained by considering a temporal relationship between at least two encoding target pictures temporally adjacent to the skipped frame, a down-sampled image on which the preset resolution is reflected, a up-sampled image on which the preset resolution is reflected, etc. may be generated as the reconstructed image by the reference picture storage unit 25.

A method of generating the reconstructed image performed by the reconstructed image generation unit 26 may be identical to the method of generating the reconstructed image performed by the image encoding apparatus. Accordingly, the method of generating the reconstructed image may be preset and stored, or may be included the encoded data, for example, the information indicating the encoding level.

Hereinafter, an image encoding apparatus and an image decoding apparatus according to a second image encoding apparatus and image decoding apparatus of the present disclosure will be described.

For example, the image encoding apparatus and the image decoding apparatus according to the second embodiment of the present disclosure determines an encoding level by controlling a frame rate of an input image or skipping of a frame included in the input image, and encodes and decodes the input image based on the determined encoding level.

Figure 3:
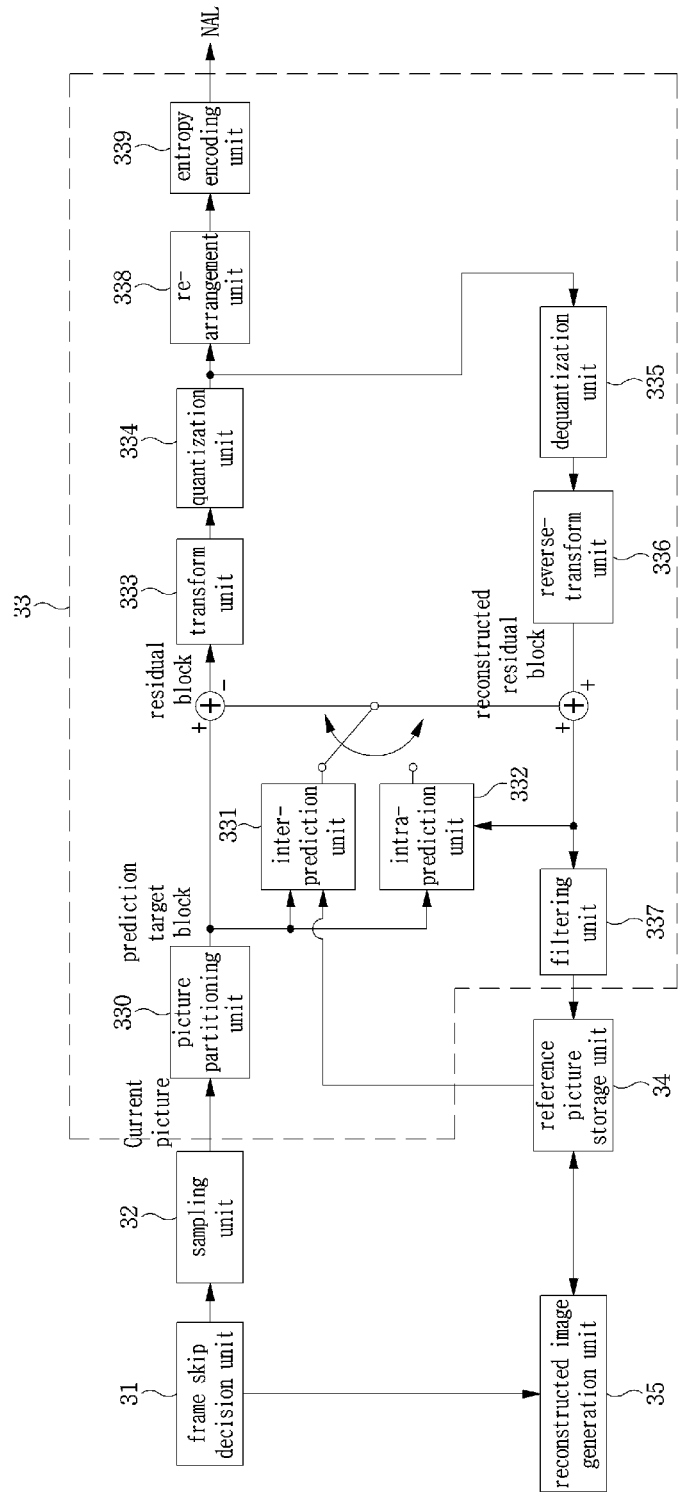
FIG. 3 is a block diagram showing a configuration of an image encoding apparatus according to a second embodiment of the present disclosure.

FIG. 3 is a block diagram showing the image encoding apparatus according to the second embodiment of the present disclosure.

Referring to FIG. 3, the image encoding apparatus according to the second embodiment of the present disclosure may include a frame skip decision unit 31, a sampling unit 32, an encoding unit 33, a reference picture storage unit 34, and a reconstructed image generation unit 35.

First, the input image may be configured with a preset frame rate and a preset resolution. The encoding level decision unit 11 may determine an encoding level of the input image by controlling the frame rate or resolution of the input image.

The frame skip decision unit 31 may determine whether or not to skip at least one of a plurality of frames that are temporally consecutive in the input image.

Preferably, the frame skip decision unit 31 may determine the encoding level of the input image based on a quality of an image reconstructed from encoded data with a frame included in the input image being skipped, and a similarity between frames included in the input image.

For example, the frame skip decision unit 31 performs encoding by skipping a predetermined frame included in the input image, and checks a quality of an image reconstructed when processing the encoding. In addition, when the quality of the reconstructed image represents a value that is relatively higher than a preset threshold value (for example, quality threshold value), the frame skip decision unit 31 may determine to skip a corresponding frame. Alternatively, when the quality of the reconstructed image represents a value that is relatively lower than a preset threshold value (for example, quality threshold value), the frame skip decision unit 31 may determine not to skip the corresponding frame.

Alternatively, as another example, the frame skip decision unit 31 may determine the encoding level by comparing the quality of the image reconstructed from encoded data in which the frame included in the input image is skipped with the quality of the image reconstructed from encoded data of the input image, and by considering the quality that is highest quality. In addition, the frame skip decision unit 31 may check a similarity between frames included in the input image. In addition, when the similarity between frames included in the input image represents a value that is relatively higher than a preset threshold value (for example, similarity threshold value), the frame skip decision unit 31 may determine to skip a corresponding frame. Alternatively, when the similarity between frames included in the input image represents a value that is relatively lower than a preset threshold value (for example, similarity threshold value), the frame skip decision unit 31 may determine not to skip the corresponding frame.

The frame skip decision unit 31 may store at least one of information indicating the frame determined to be skipped, and information indicating the frame determined not to be skipped in a storage medium such as a buffer.

The frame skip decision unit 31 may provide information indicating whether or not the frame is skipped to the encoding unit 33 so that the encoding unit 33 may encode the information indicating whether or not the frame is skipped when encoding the encoding target picture.

The frame skip decision unit 31 may provide to the sampling unit 32 the information indicating whether or not the frame is skipped, and the sampling unit 32 may detect the encoding target picture based on the information indicating whether or not the frame is skipped, and provide the detected encoding target picture to the encoding unit 33.

Meanwhile, when the frame skip decision unit 31 is configured to determine whether or not to skip the frame based on the quality of the image reconstructed from encoded data with the frame included in the input image being skipped, the sampling unit 32 may control the frame rate of the input image, and output a frame obtained by sampling the frame of the input image in a predetermined time unit. In addition, the sampling unit 32 may store a frame that is not sampled in the predetermined time unit or information indicating the frame that is not sampled in the predetermined time unit in a storage medium such as a buffer. In response to the information indicating whether or not to skip the frame which is provided by the frame skip decision unit 31, the sampling unit 32 may output a frame that is not sampled in the predetermined time unit as the encoding target picture. In other words, when the frame skip decision unit 31 determines not to skip the frame, the sampling unit 32 may output the frame that is not sampled in the predetermined time unit as the encoding target picture.

As another example, when the frame skip decision unit 31 is configured to determine whether or not to skip the frame based on the similarity between frames included in the input image, the sampling unit 32 may output frames determined not to be skipped by the frame skip decision unit 31 as the encoding target picture.

The reference picture storage unit 34 may store a reconstructed block or picture calculated by a filtering unit 337 of the encoding unit 33. The stored reconstructed block or picture may be provided to prediction units 331 and 332 when performing inter-prediction.

The reconstructed image generation unit 35 may be provided with at least one of information indicating the frame included in the input image and being determined to be skipped by the frame skip decision unit 31, and information indicating the frame determined not to be skipped by the frame skip decision unit 31. Accordingly, the reconstructed image generation unit 35 may generate a reconstructed image corresponding to the skipped frame.

The reconstructed image generation unit 35 may generate the reconstructed image corresponding to the skipped frame by using at least one reconstructed picture stored in the reference picture storage unit 34. For example, the reconstructed image generation unit 35 may generate the reconstructed image by duplicating a frame identical to a frame that is temporally adjacent to the skipped frame. Alternatively, as another example, the reconstructed image generation unit 35 may generate the reconstructed image corresponding to the skipped frame by considering a temporal arrangement between the skipped frame and at least one other frame. In detail, when the skipped frame is a frame arranged at a predetermined timing t, the reconstructed image generation unit 35 may generate the reconstructed image by performing interpolation on a first frame arranged at a previous timing t−1 of the skipped frame, and a second frame arranged at a following time t+1 of the skipped frame.

The reconstructed image generation unit 35 may provide the reconstructed image to the reference picture storage unit 34, and the reference picture storage unit 34 may store the reconstructed image, thus the encoding unit 33 may use the reconstructed image corresponding to the skipped frame when encoding the encoding target picture.

Meanwhile, the encoding unit 33 may encode information indicating whether or not the frame is skipped. Particularly, the information indicating whether or not the frame is skipped may be included in a field of a sequence parameter set, and a picture parameter set.

The information indicating whether or not the frame is skipped may include information capable of predicting the skipped frame.

The information indicating whether or not the frame is skipped may include a frame rate of the input image and a frame rate of the encoding target picture.

The skipped frame indicating whether or not the frame is skipped may include information indicating a temporal position of the skipped frame.

In addition, the encoding unit 33 may encode the encoding target picture. Hereinafter, an encoding operation of the encoding target picture will be described.

The encoding unit 33 may include a picture partitioning unit 330, prediction units 331 and 332, a transform unit 333, a quantization unit 334, a dequantization unit 335, a reverse-transform unit 336, a filtering unit 337, a re-arrangement unit 338, and an entropy encoding unit 339.

Although elements shown in FIG. 3 are independently shown so as to describe different features and functions of the image encoding apparatus, such a configuration does not indicate that each element is constructed by a separate hardware constituent or software constituent. In other words, the elements are independently arranged and at least two elements may be combined into a single element, or a single element may be divided into a plurality of elements to perform functions. It is to be noted that embodiments in which some elements are integrated into one combined element and/or an element is divided into multiple separate elements are included in the scope of the present disclosure without departing from the essence of the present disclosure.

Some constituents are not essential to the substantial functions in the disclosure and may be optional constituents for merely improving performance. The disclosure may be embodied to include only constituents essential to embodiment of the disclosure, except for the constituents used to merely improve performance. The structure including only the essential constituents except for the optical constituents used to merely improve performance belongs to the scope of the disclosure.

The picture partitioning part 330 may partition an input picture into at least one process unit. Herein, the process unit may be a prediction unit (PU), a transform unit (TU), or a coding unit (CU). In the picture partitioning unit 330, a single picture may be partitioned into a combination of a plurality of CUs, PUs, and TUs, and the picture may be encoded by selecting a combination of a single coding unit, a prediction unit, and a transform unit based on a predetermined condition (for example, cost function).

For example, a single picture may be partitioned into a plurality of CUs. In order to partition the picture into a coding unit, a recursive tree structure such as a quad tree structure may be used. The coding unit that is partitioned into other coding units by using a picture or a largest coding unit as a root may be partitioned to have child nodes as many as a number of partitioned coding units. A coding unit that is not partitioned any further according to a certain constraint becomes a leaf node. In other words, when it is assumed that only a square partition is available for one coding unit, one coding unit may be partitioned into maximum four different coding units.

Hereinafter, in an embodiment of the present disclosure, the meaning of the coding unit may be used to refer to not only a unit for encoding but also a unit for decoding.

The prediction unit may be partitioned into a form of at least one of a square or a rectangle having the same size within a single coding unit. Alternatively, the prediction unit may be partitioned into a form of at least one of a square or a rectangle having the same size within one coding unit, or may be partitioned into a form such that, among prediction units partitioned within one coding unit, the shape of one prediction unit is different from the shape of the other prediction unit.

When generating the prediction unit for performing an intra-prediction based on the coding unit and the coding unit is not a minimum coding unit, the intra-prediction may be performed without partitioning the coding unit into a plurality of prediction units (N×N).

The prediction units 331 and 332 may include an inter-prediction unit 331 performing inter-prediction and an intra-prediction unit 332 performing intra-prediction. With respect to the prediction units, it may be determined whether to perform the inter-prediction or whether to perform the intra-prediction, and detailed information (for example, an intra prediction mode, a motion vector, a reference picture, etc.) according to each prediction method may be determined. Herein, a process unit for performing the prediction and a process unit for determining the prediction method and a specific detail may be different. For example, the prediction method and the prediction mode may be determined in a prediction unit and the prediction may be performed in a transform unit. A residue value (a residue block) between a generated prediction block and an original block may be input to the transform unit 333. In addition, prediction mode information and motion vector information used for the prediction may be encoded in the entropy encoding unit 339 along with the residue value to be transmitted to the decoding unit. When using a specific encoding mode, it is possible that the prediction block is not generated through the prediction units 331 and 332 but the original block is encoded as it is to be transmitted to the decoder.

The inter-prediction unit 331 may predict the prediction unit based on information of at least one picture of a previous picture and a following picture of a current picture. In some cases, the prediction unit may be predicted based on information of a partial region within the current picture and which has been encoded. The inter-prediction unit 331 may include a reference picture interpolation unit, a motion predictor, and a motion compensator.

The reference picture interpolation unit may be provided with reference picture information from the reference picture storage unit 34, and may generate a number of pieces of pixel information less than an integer number of pixels from the reference picture. In case of a luma pixel, a DCT-based 8 tap interpolation filter having various filter coefficients may be used to generate a number of pieces of pixel information less than the integer number of pixels in a unit of ¼ pixel. In case of a chroma pixel, a DCT-based 4 tap interpolation filter having various filter coefficient may be used to generate a number of pieces of pixel information less than the integer number of pixels in a unit of ⅛ pixel.

The motion prediction module may perform motion prediction based on a reference picture interpolated by the reference picture interpolation unit. For a method of obtaining the motion vector, various methods such as full search-based block matching algorithm (FBMA), three step search (TSS), or new three-step (NTS) search algorithm may be used. The motion vector may have a motion vector value in a unit of ½ or ¼ pixels based on the interpolated pixel. The motion predictor may predict a current prediction unit by varying the motion prediction method. For the motion prediction method, various methods such a skip method, a merge method, an advanced motion vector prediction (AMVP) method, an intra block copy method, etc. may be used.

The intra-prediction unit 332 may set the prediction unit based on reference pixel information adjacent to a current block which is pixel information within the current picture, and may generate the prediction block by performing intra-prediction for the set prediction unit. When a neighboring block of the current prediction unit is a block on which the inter-prediction is performed whereby a reference pixel is a pixel on which the inter-prediction is performed, the reference pixel included in the block on which the inter-prediction is performed may replace the reference pixel information of the neighboring block on which the intra-prediction is performed. In other words, when the reference pixel is not available, at least one unavailable reference pixel may be replaced with at least one available reference pixel.

In the intra-prediction, the prediction mode may have a directional prediction mode that uses the reference pixel information according to a prediction direction, and a non-directional mode that does not use the directional information when performing the prediction. A mode for predicting luma information and a mode for predicting chroma information may be different. Intra-prediction mode information used for predicting the luma information, or predicted luma signal information may be used for predicting the chroma information.

When the size of the prediction unit and the size of the transform unit are the same when performing the intra-prediction, the intra-prediction for the prediction unit may be preformed based on a pixel present in a left side of the prediction unit, a pixel present in a left upper side of the prediction unit, and a pixel present in an upper side of prediction unit. However, when the size of the prediction unit and the size of the transform unit are different when performing the intra-prediction, the intra-prediction may be performed by using a reference pixel based on the transform unit. In addition, an intra-prediction that uses an N×N partition only with respect to the minimum prediction unit may be used.

In the intra-prediction method, according to the prediction mode, the prediction block may be generated by applying an adaptive intra smoothing (AIS) filter to the reference pixel. A kind of the AIS filter that is applied to the reference pixel may be different. In order to perform the intra-prediction method, the intra-prediction mode of the current prediction unit may be predicted from the intra-prediction mode of a prediction unit that is present around the current prediction unit. When the prediction mode of the current prediction unit is predicted by using mode information predicted from a neighboring prediction unit, and the intra-prediction modes of the current prediction unit and the neighboring prediction unit are the same, information that the prediction modes of the current prediction unit and the neighboring prediction unit are the same may be transmitted using predetermined flag information. Alternatively, when the prediction modes of the current prediction unit and the neighboring prediction unit are different, prediction mode information of the current block may be encoded by performing entropy encoding.

In addition, a residual block including residual value information that is a difference value between the prediction unit and an original block of the prediction unit. The prediction unit predicted based on the prediction unit generated in the prediction units 331 and 332, and an original block of the prediction unit. The generated residual block may be input to the transform part 333.

The transform unit 333 may transform the residual block including the residual value information and generated through the original block and the prediction units 331 and 332 by using a transformation method such as a discrete cosine transform (DCT), a discrete sine transform (DST), a Karhunen-Loeve Transform (KLT), etc. Whether to apply the DCT, the DST, or the KLP in order to transform the residual block may be determined based on the intra-prediction mode information of the prediction unit used for generating the residual block.

The quantization unit 334 may quantize values that are transformed in a frequency region by the transform unit 333. According to a block or an importance of an image, a quantization coefficient may vary. A value calculated by the quantization unit 334 may be provided to the dequantization unit 335 and the re-arrangement unit 338.

The re-arrangement unit 338 may re-arrange the coefficient value with respect to the quantized residue value.

The re-arrangement unit 338 may change coefficients of a two-dimensional block form into a one-directional vector form by using a coefficient scanning method. For example, in the re-arrangement unit 338, from a DC coefficient to a coefficient in a high frequency region may be scanned to be transformed to a one-dimension vector form by using a zig-zag scanning method. According to a size of a transform unit and an intra-prediction mode, a vertical scanning method of scanning the two-dimensional block form coefficients in a column direction, and a horizontal scanning method of scanning the two-dimensional block form coefficients in a row direction may be used instead of the zig-zag scanning method. In other words, according to the size of a transform unit and the intra-prediction mode, whether to use a zig-zag scanning method, a vertical scanning method, or a horizontal scanning method may be determined.

The entropy encoding unit 339 performs entropy encoding based on values calculated by the re-arrangement unit 338. The entropy encoding may use various encoding methods such as, for example, exponential golomb, context-adaptive variable length coding (CAVLC), and context-adaptive binary arithmetic coding (CABAC), etc.

The entropy encoding unit 339 may encode various types of information such as, residual value coefficient information and block type information of a coding unit, prediction mode information, partition unit information, prediction unit information, transmission unit information, motion vector information, reference frame information, block interpolation information, and filtering information which are received from the re-arrangement unit 338 and the prediction units 331 and 332.

The entropy encoding unit 339 may entropy encode the coefficient value of the coding unit input from the re-arrangement module 338.

Figure 4:
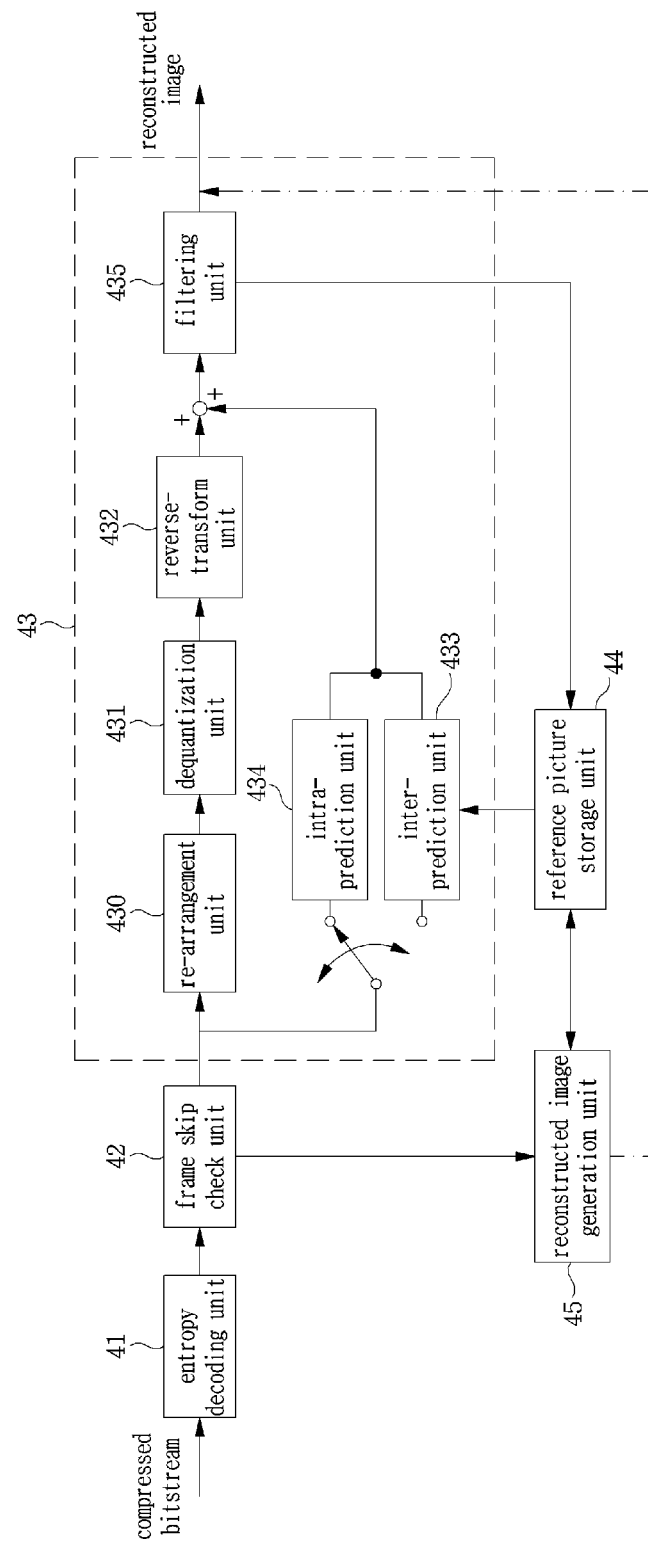
FIG. 4 is a block diagram showing a configuration of an image decoding apparatus according to a second embodiment of the present disclosure.

FIG. 4 is a block diagram showing a configuration of an image decoding apparatus according to a second embodiment of the present disclosure.

Referring to FIG. 4, the image decoding apparatus according to the second embodiment of the present disclosure may include an entropy decoding unit 41, a frame skip check unit 42, a decoding unit 43, a reference picture storage unit 44, and a reconstructed image generation unit 45.

Similar to the image decoding apparatus according to the first embodiment of the present disclosure, the entropy decoding unit 41 included in the image decoding apparatus according to the second embodiment of the present disclosure may perform entropy decoding in an opposite order of the entropy encoding performed in the entropy encoding unit of the image encoding apparatus. For example, in response to the method performed in image encoding apparatus, various methods such as exponential golomb, context-adaptive variable length coding (CAVLC), context-adaptive binary arithmetic coding (CABAC), etc. may be used.

In the image encoding apparatus, an encoding level of an input image may be determined based on a quality of an image reconstructed from encoded data with a frame included in the input image being skipped and a similarity between frames included in the input image, and information indicating whether or not the frame is skipped may be encoded. In response to this, the frame skip check unit 42 may check information indicating whether or not a frame is skipped from entropy decoded data.

The information indicating the encoding level may be included in a field of a sequence parameter set and a picture parameter set, and the frame skip check unit 42 may check information indicating whether or not the frame is skipped from the information included in the field of the sequence parameter set, or the picture parameter set.

The information indicating whether or not the frame is skipped may include information indicating a frame rate of the input image, and a frame rate of the encoding target picture. Alternatively, the information indicating whether or not the frame is skipped may include information indicating a temporal position of the framed determined to be skipped may be preset and stored.

In response to this, the frame skip check unit 42 may provide the information indicating whether or not the frame is skipped to the decoding unit 43, and the reconstructed image generation unit 45.

The encoded data may be data in which the encoding target picture is encoded, and the encoding target picture may include an image in which a predetermined frame included in the input image is skipped. In response to this, the decoding unit 43 may need pixel color information of the skipped frame when decoding an encoding target picture.

Accordingly, the reconstructed image generation unit 45, in response to the encoding level, may generate a reconstructed image including the pixel color information of the skipped frame, and store the generated reconstructed image in the reference picture storage unit 44.

The method of generating the reconstructed image by the reconstructed image generation unit 45 may be identical to the method of generating the reconstructed image by the image encoding apparatus. Accordingly, the method of generating the reconstructed image may be preset and stored, and may be included in encoded data, in other words, the information indicating whether or not the frame is skipped.

For example, the reconstructed image generation unit 45 may generate a reconstructed image corresponding to the skipped frame by using at least one reconstructed picture stored in the reference picture storage unit 44. For example, the reconstructed image generation unit 45 may generate the reconstructed image by duplicating a frame identical to a frame that is temporally adjacent to the skipped frame. Alternatively, as another example, the reconstructed image generation unit 45 may generate the reconstructed image corresponding to the skipped frame by considering a temporal arrangement of the skipped frame with at least one other frame. In detail, when the skipped frame is a frame arranged at a predetermined timing t, the reconstructed image generation unit 45 may generate the reconstructed image by performing interpolation on a first frame arranged at a previous timing t−1 of the skipped frame, and a second frame arranged at a following time t+1 of the skipped frame.

The decoding unit 43 may decode an entropy decoded bitstream.

In detail, the decoding unit 43 may include a re-arrangement unit 430, a dequantization unit 431, a reverse-transform unit 432, prediction unit 433 and 434, and a filtering unit 435.

The re-arrangement unit 430 may perform rearrangement of the bitstream that is entropy decoded by entropy decoding unit based on a re-arrangement method of the encoding unit. Coefficients expressed in a one-dimensional vector form may be again reconstructed and re-arranged in a two-dimensional block form. The re-arrangement unit 430 may be provided with information related to a coefficient scanning method performed by the encoding unit, and may perform re-arrangement through a method of reverse-scanning method based on an order of scanning performed by a corresponding encoding unit.

The dequantization unit 431 may perform dequantization based on a quantized parameter and coefficient values of the rearranged block provided from the encoding unit.

The reverse-transform unit 432 may perform a reverse DCT, a reverse DST, and a reverse KLT with respect to the DCT, the DST, and the KLT performed by the transformation unit with respect to a result of quantization performed by the image encoding unit. The reverse-transform may be performed based on a transmission unit determined by the image encoding unit. In the reverse-transform unit 432 of the image decoding unit, the transform method (for example, DCT, DST, KLT) may be selectively performed according to a plurality of types of information such as the prediction method, a size of a current block, and a prediction direction.

The prediction units 433 and 434 may generate a prediction block based on information related to generating the prediction block and provided from the entropy decoding unit 210, and previously decoded block or picture information provided by a memory 245.

As described above, identical to the operation of the image encoding unit, when the size of the prediction unit and the size of the transform unit are the same when performing the intra-prediction, the intra-prediction for the prediction unit may be performed based on a pixel present in a left side of the prediction unit, a pixel present in a left upper side of the prediction unit, and a pixel present in an upper side of the prediction unit. However, when the size of the prediction unit and the size of the transform unit are different when performing the intra-prediction, the intra-prediction may be performed by using a reference pixel based on the transform unit. In addition, an intra-prediction that uses an N×N partition only with respect to the minimum prediction unit may be used.

The prediction units 433 and 434 may include a prediction unit decision part, an inter-prediction pa unit rt, and an intra-prediction unit. The prediction unit decision unit may receive various types of information such as prediction unit information, prediction mode information of the intra prediction method, and motion prediction related information of the inter prediction method input from the entropy decoding unit 210; distinguish a prediction unit of the current coding unit; and determine whether the prediction unit performs the inter prediction or the intra prediction. The inter-prediction unit 433 may perform the inter-prediction with respect to the current prediction unit based on information included in at least one picture of a previous picture and a following picture of the current picture including the current prediction unit by using information required for the inter-prediction of the current prediction unit provided by the image encoding unit. Alternatively, the inter-prediction may be performed based on information of a reconstructed partial region of within the current picture including the current prediction unit.

In order to perform the inter-prediction, whether a motion prediction method of a prediction unit included in a corresponding coding unit is a skip mode, a merge mode, or an AMVP mode may be determined based on the coding unit.

The intra-prediction unit 434 may generate a prediction block based on pixel information within the current picture. When the prediction unit is a prediction unit on which the intra-prediction is performed, the prediction block may be generated by performing the intra-prediction based on intra-prediction mode information of the prediction unit provided by the image encoding unit. The intra-prediction unit 434 may include an adaptive intra smoothing filter (AISF), a reference pixel interpolation unit, and a DC filter. The adaptive intra smoothing filter is a part for performing filtering on the reference pixel of the current block, and whether to apply the filter may be determined and applied according to the prediction mode of the current prediction unit. An adaptive intra smoothing filtering may be performed on a reference pixel of the current block by using the prediction mode of the prediction unit and AIS filter information provided by the image encoding unit. When the prediction mode of the current block is a mode that does not perform the AIS filtering, the AIS filter may not be applied.

The reference pixel interpolation unit may generate a reference pixel in a pixel unit less than an integer value by interpolating the reference pixel when the prediction mode of the prediction unit is the prediction unit for performing intra-prediction based on a pixel value of the interpolated reference pixel. When the prediction mode of the current prediction unit is a prediction mode that generates the prediction block without interpolating the reference pixel, the reference pixel may not be interpolated. A DC filter may generate the prediction block through filtering when the prediction mode of the current block is a DC mode.

The reconstructed block or picture may be provided to the filtering unit 435. The filtering unit 435 may include a deblocking filter, an offset correction module, and an adaptive loop filter (ALF).

Hereinafter, an image encoding apparatus and an image decoding apparatus according to a third embodiment of the present disclosure will be described.

The image encoding apparatus and the image decoding apparatus according to the third embodiment of the present disclosure determine, for example, an encoding level by controlling a spatial resolution of each frame (or picture) included in an input image, and encode and decode the input image based on the determined encoding level.

Figure 5:
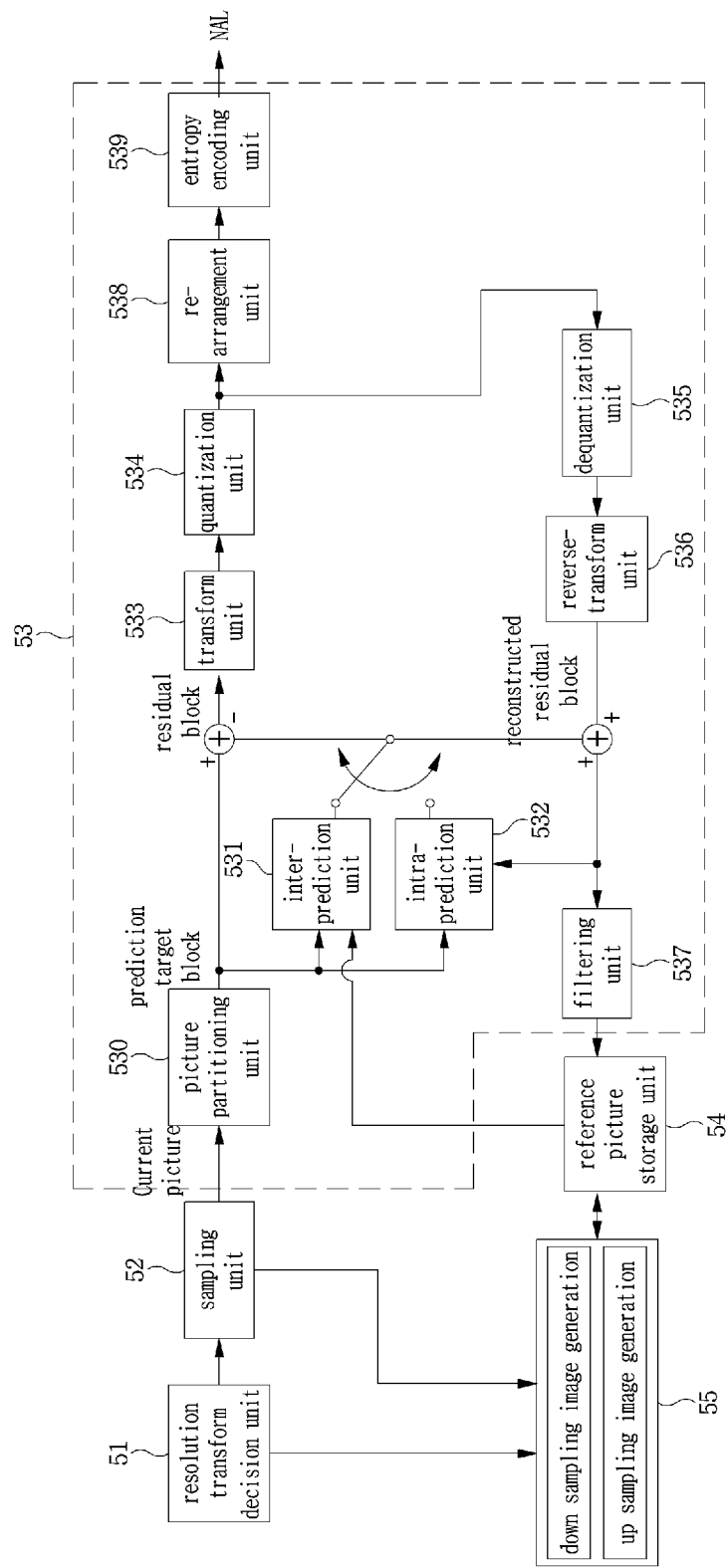
FIG. 5 is a block diagram showing a configuration of an image encoding apparatus according to a third embodiment of the present disclosure.

FIG. 5 is a block diagram showing a configuration of the image encoding apparatus according to the third embodiment of the present disclosure.

Referring to FIG. 5, the image encoding apparatus according to the third embodiment of the present disclosure may include a resolution transform decision unit 51, a sampling unit 52, an encoding unit 53, a reference picture storage unit 54, and a reconstructed image generation unit 55.

First, an input image may be configured with a preset frame rate and a preset resolution, in the third embodiment of the present disclosure, the resolution transform decision unit 51 may determine an encoding level of the input image by controlling a spatial resolution of a picture included in the input image.

The resolution transform decision unit 51 may determine whether or not to transform a spatial resolution of a picture included in the input image. In addition, the sampling unit 52 may provide a picture included in the input image without performing any transform to the encoding unit 53, or transform the picture included in the input image in a predetermined resolution to the encoding unit 53 based on information indicating whether or not to transform the resolution which is provided from the resolution transform decision unit 51.

In addition, the resolution transform decision unit 51 may determine whether or not the resolution of the picture is transformed based on a quality of an image reconstructed from encoded data in which the resolution is transformed, and a similarity between the picture included in the input image and the picture in which the resolution is transformed.

First, for example, an operation of determining whether or not to transform the resolution of the picture by the resolution transform decision unit 51 from encoded data in which the resolution is transformed will be described.

The sampling unit 52 may output a picture obtained by transforming the input image to a predetermined resolution (or down-sampling). Herein, the sampling unit 52 may store information indicating a resolution of the input image and the transformed resolution in a storage medium such as buffer.

In response to this, the encoding unit 53 may encode the picture transformed in the predetermined resolution (or down-sampled), and generate a reference picture reconstructed when encoding the picture, in other words, an encoded and reconstructed reference picture (transformed and down-sampled reference picture) by the resolution transform.

The transformed and down-sampled reference picture may be provided to the resolution transform decision unit 51. Accordingly, the resolution transform decision unit 51 may check a quality of the transformed and down-sampled reference picture, and determine whether or not to transform the resolution.

In detail, the resolution transform decision unit 51 may determine to transform a resolution of a corresponding picture when the quality of the transformed and down-sampled reference picture represent a value that is relatively higher than a preset threshold value (for example, quality threshold value). Alternatively, when the quality of the transformed and down-sampled reference picture represents a value that is relatively lower than a preset threshold value (for example, quality threshold value), the resolution transform decision unit 51 may determine not to transform the resolution of the corresponding picture.

As another example, the resolution transform decision unit 51 may determine whether or not to transform the resolution by comparing a quality of a reference picture reconstructed by encoding the transformed and down-sampled image and a quality of a reference image reconstructed by encoding the input image, and by considering the image having the quality highest quality.

Since the resolution transform decision unit 51 outputs the information indicating to transform a resolution of a corresponding resolution, the sampling unit 52 determines that encoding of the corresponding picture has been completed, and performs transforming (or down-sampling) of a next picture. Meanwhile, when the resolution transform decision unit 51 outputs information indicating not to transform the resolution of the corresponding picture, the sampling unit 52 provides the picture included in the input image without performing any transform to the encoding unit 53.

As another example, an operation to determine whether or not to transform a resolution of a picture by the resolution transform decision unit 51 based on a similarity between a picture of the input image and a picture with a resolution transformed will be described.

The sampling unit 52 may provide a picture obtained by transforming the input image to a predetermined resolution (or down-sampling) to the resolution transform decision unit 51. Accordingly, the resolution transform decision unit 51 may calculate a similarity between the picture of the input image and the picture with a resolution thereof being transformed. The resolution transform decision unit 51 may determine to transform the resolution of the corresponding picture when the calculated similarity represents a value that is relatively higher than a preset threshold value (for example, similarity threshold value). Alternatively, when the similarity represents a value that is relatively lower than a preset threshold value (for example, similarity threshold value), the resolution transform decision unit 51 may determine not to transform the resolution of the corresponding picture.

Since the resolution transform decision unit 51 outputs information indicating to transform the resolution of the corresponding picture, the sampling unit 52 transforms the corresponding picture to the predetermined resolution (or down-samples) and provides the transformed picture to the encoding unit 53. In addition, the encoding unit 53 encodes the picture with the resolution thereof being transformed (or down-sampled) as the encoding target picture.

Meanwhile, when the resolution transform decision unit 51 outputs information indicating not to transform the resolution of the corresponding picture, the sampling unit 52 output the picture included in the input image without performing any transform and provides to the encoding unit 53. The encoding unit 53 encodes the picture included in the input image as the encoding target picture.

Meanwhile, since the encoding unit 53 may receive a picture with a resolution thereof being transformed or a picture with a resolution thereof not being transformed as the encoding target picture, reference pictures with a resolution different from each other may be stored in the reference picture storage unit 54 when encoding. Since the resolutions of reference pictures used when encoding may be different, the resolutions of the encoding target picture and the reference picture may be matched with each other.

When the resolutions of the encoding target picture and the reference picture are different, the encoding unit 53 may request a reconstructed image associated with the resolution of the encoding target picture to the reconstructed image generation unit 55. Accordingly, the reconstructed image generation unit 55 may generate a reconstructed image by transforming (for example, up-sampling or down-sampling) the reference picture stored in the reference picture storage unit 54, and store the generated reconstructed image in the reference picture storage unit 54.

Meanwhile, the encoding unit 13 may encode information indicating whether or not to transform a resolution. Particularly, the information indicating whether or not to transform the resolution may be included in a field of a sequence parameter set, and a picture parameter set.

The information indicating whether or not to transform the resolution may include a resolution of the input image and a resolution of the encoding target picture.

The encoding unit 53 may encode the encoding target picture. The encoding unit 53 included in the third embodiment of the present disclosure may process, except for the operation of matching resolutions of the encoding target picture and the reference picture described above, operations identical to the encoding unit 33 included in the image encoding apparatus according to the second embodiment of the present disclosure. Accordingly, a detailed operation of the encoding unit 53 included in the third embodiment of the present disclosure will be performed with reference to the operation of the encoding unit 33 included in the image encoding apparatus according to the second embodiment of the present disclosure.

Figure 6:
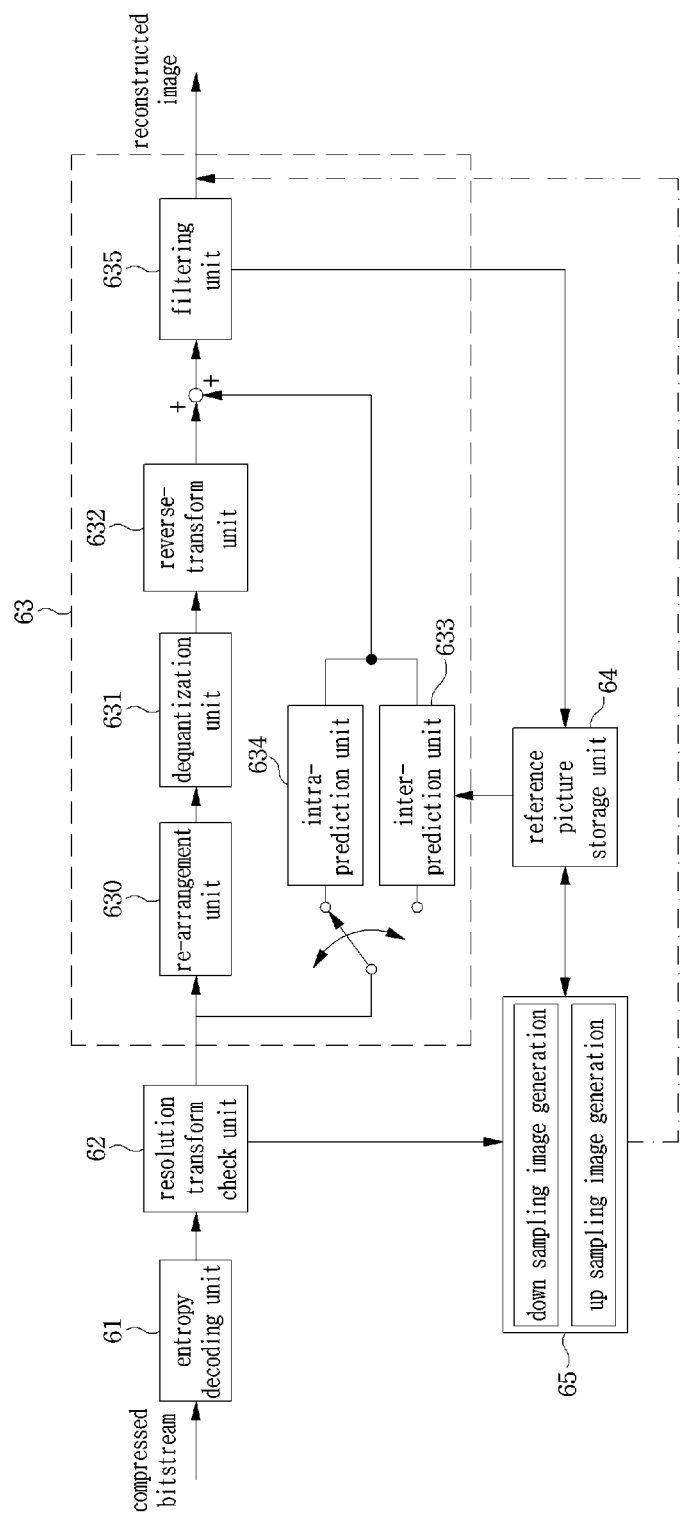
FIG. 6 is a block diagram showing a configuration of an image decoding apparatus according to a third embodiment of the present disclosure.

FIG. 6 is a block diagram showing a configuration of the image decoding apparatus according to the third embodiment of the present disclosure Referring to FIG. 6, the image decoding apparatus according to the third embodiment of the present disclosure may include an entropy decoding unit 61, a resolution transform check unit 62, a decoding unit 63, a reference picture storage unit 64, and a reconstructed image generation unit 65.

Similar to the image decoding apparatus according to the first embodiment of the present disclosure, the entropy decoding unit 61 included in the image decoding apparatus according to the third embodiment of the present disclosure may perform entropy decoding in an opposite order of performing the entropy encoding in the entropy encoding unit of the image encoding apparatus. For example, in response to the method performed in the image encoding apparatus, various methods such as exponential golomb, context-adaptive variable length coding (CAVLC), context-adaptive binary arithmetic coding (CABAC), etc. may be used.

The image encoding apparatus may encode and store information indicating whether or not to transform a resolution. In response to this, the frame skip check unit 42 may check information indicating whether or not to transform a resolution from entropy decoded data.

The information indicating whether or not to transform the resolution may be included in a field of a sequence parameter set, and a picture parameter set. The resolution transform check unit 62 may check information indicating whether or not to transform a resolution from the information included in the field of the sequence parameter set, or the picture parameter set.

The information indicating whether or not to transform the resolution may include a resolution of an input image and a resolution of an encoding target picture.

The resolution transform check unit 62 may provide the information indicating whether or not to transform the resolution to the decoding unit 63, and the reconstructed image generation unit 65.

In response to this, the decoding unit 63 may decode an entropy decoded bitstream. A reference picture stored in the reference picture storage unit 64 may be used when decoding.

The encoded data may be data obtained by encoding the encoding target picture, and the encoding target picture may include a picture included in the input image or a picture with a resolution thereof being transformed to a predetermined resolution. The picture included in the input image or the picture with the resolution thereof being transformed in the predetermined resolution may have resolutions different from each other. Accordingly, reference pictures stored in the reference picture storage unit 64 may have resolutions different from each other, thus a reference picture with a resolution required when decoding may not be present in the reference picture storage unit 64. Accordingly, the decoding unit 63 may request a generation of a reconstructed image to the reconstructed image generation unit 65 according to the need.

The reconstructed image generation unit 65 may generate a reconstructed image having a resolution required by the decoding unit 63, and store the generated reconstructed image in the reference picture storage unit 64.

A method of generating the reconstructed image by the reconstructed image generation unit 65 may be identical to the method of generating the reconstructed image by the image encoding apparatus. Accordingly, the method of generating the reconstructed image may be preset and stored, and may be included in encoded date, in other words, information indicating whether or not to transform the resolution.

For example, the reconstructed image generation unit 65 may generate the reconstructed image by up-sampling or down-sampling at least one reconstructed picture stored in the reference picture storage unit 44.

Meanwhile, the decoding unit 63 may decode entropy decoded bitstream.

The decoding unit 63 included in the third embodiment of the present disclosure process, except for the operation of matching resolutions of the encoding target picture and the reference picture described above, operates similar to the decoding unit 43 included in the image decoding apparatus according to the second embodiment of the present disclosure. Accordingly, a detailed description of the decoding unit 63 included in the third embodiment of the present disclosure will be provided with reference to the operation of the decoding unit 43 included in the image encoding apparatus according to the second embodiment of the present disclosure.

Hereinafter, an image encoding apparatus and an image decoding apparatus according to a fourth embodiment of the present disclosure will be described.

The image encoding apparatus and the image decoding apparatus according to the fourth embodiment of the present disclosure determines, for example, an encoding level by controlling a spatial resolution of each frame (or picture) included in an input image, and encodes and decodes the input image based on the determined encoding level.

Figure 7:
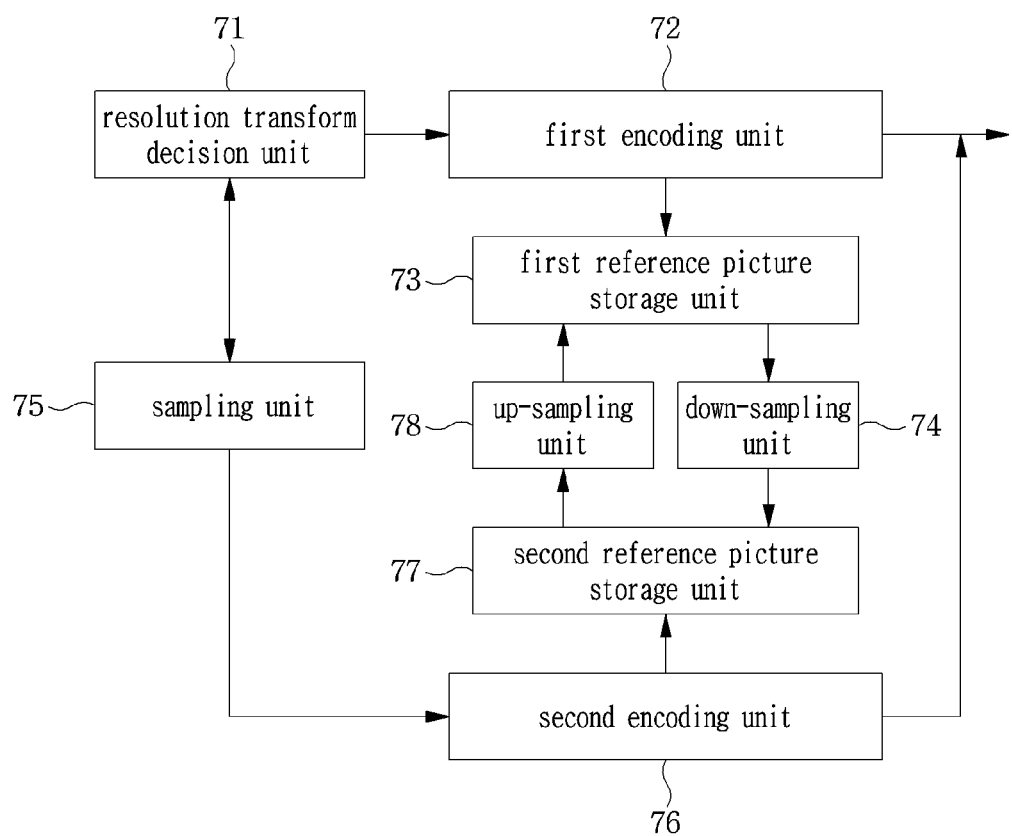
FIG. 7 is a block diagram showing a configuration of an image encoding apparatus according to a fourth embodiment of the present disclosure.

FIG. 7 is a block diagram showing a configuration of the image encoding apparatus according to the fourth embodiment of the present disclosure.

Referring to FIG. 7, the image encoding apparatus according to the fourth embodiment of the present disclosure may include a resolution transform decision unit 71, a first encoding unit 72, a first reference picture storage unit 73, a down-sampling unit 74, a sampling unit 75, a second encoding unit 76, a second reference picture storage unit 77, and an up-sampling unit 78.

First, an input image may be configured with a preset frame rate and a preset resolution, and in the fourth embodiment of the present disclosure, the resolution transform decision unit 71 may determine an encoding level of the input image by controlling a spatial resolution of a picture included in the input image.

The resolution transform decision unit 71 may determine whether or not to transform a spatial resolution of a picture included in the input image.

Based on information indicating whether or not to transform the resolution which is provided by the resolution transform decision unit 71, the sampling unit 75 may transform the picture in which the spatial resolution thereof is determined to be transformed in a predetermined resolution, and provide the transformed picture to the second encoding unit 76.

In addition, the resolution transform decision unit 71 may determine whether or not to transform the resolution of the picture based on a quality of an image reconstructed from encoded date with the resolution being transformed, and a similarity between a resolution of the picture included in the input image and the picture with the resolution thereof being transformed.

First, for example, an operation of determining whether or not to transform the resolution of the picture by the resolution transform decision unit 71 from encoded data with the resolution being transformed based on the quality of the reconstructed image will be described.

The sampling unit 75 may output a picture obtained by transforming the input image to a predetermined resolution (or down-sampled). In response to this, the second encoding unit may encode the picture transformed to the predetermined resolution (or down-sampled). A reference picture reconstructed when encoding the picture, in other words, an encoded and reconstructed reference picture (transformed and down-sampled reference picture) by the resolution transform may be generated.

The transformed and down-sampled reference picture may be stored in the second reference picture storage unit 77. In addition, the transformed and down-sampled reference picture may be reconstructed to a picture having a resolution of the input image by the up-sampling unit 78. The reconstructed picture generated as above, in other words, a first reconstructed picture, may be stored in the first reference picture storage unit 73. In addition, the first reconstructed picture may be provided to the resolution transform decision unit 7.

The resolution transform decision unit 71 may check a quality of the first reconstructed picture, and determine whether or not to transform the resolution.

In detail, the resolution transform decision unit 71 may determine to transform a resolution of a corresponding picture when the quality of the first reconstructed picture represent a value that is relatively higher than a preset threshold value (for example, quality threshold value). Alternatively, when the quality of the first reconstructed picture represents a value that is relatively lower than a preset threshold value (for example, quality threshold value), the resolution transform decision unit 71 may determine not to transform a resolution of a corresponding picture.

As another example, the resolution transform decision unit 71 may determine whether or not to transform a resolution by comparing the quality of the first reconstructed picture and a quality of a second reconstructed picture.

When the resolution transform decision unit 71 determines to transform a resolution of a corresponding picture, it is determined that encoding of the corresponding picture has been completed, and a transform process (or down-sampling) of a next picture is performed.

Accordingly, data encoded by the second encoding unit 76 may be output as encoded data of the corresponding picture.

Meanwhile, when the resolution transform decision unit 71 determines not to transform a resolution of a corresponding picture, the resolution transform decision unit 71 outputs and provides the picture included in the input image as it is and without performing any transform to the first encoding unit 72.

The first encoding unit 72 may encode the input picture of the input image. A reconstructed reference picture (reference picture having an original resolution) may be generated when encoding the picture, and the generated reconstructed reference picture may be stored in the first reference picture storage unit 73.

Accordingly, data encoded by the first encoding unit 72 may be output as encoded data of the corresponding picture.

In another example, the resolution transform decision unit 71 may determine whether or not to transform a resolution of a picture based on a similarity between a picture of the input image and a picture with a resolution thereof being transformed.

The sampling unit 75 may provide a picture obtained by transforming the input image in a predetermined resolution (or down-sampling) to the resolution transform decision unit 71. Accordingly, the resolution transform decision unit 51 may calculate a similarity between the picture of the input image and the picture with the resolution thereof being transformed. The resolution transform decision unit 71 may determine to transform a resolution of a corresponding picture when the calculated similarity represents a value that is relatively higher than a preset threshold value (for example, similarity threshold value). Alternatively, when the similarity represents a value that is relatively lower than a preset threshold value (for example, similarity threshold value), the resolution transform decision unit 71 may determine not to transform a resolution of a corresponding picture.

When the resolution transform decision unit 51 determines to transform a resolution of a corresponding picture, the corresponding picture is provided to the sampling unit 75, and the sampling unit 75 provides the picture with the resolution thereof being transformed to the predetermined resolution (or down-sampled) to the second encoding unit 76. In addition, the second encoding unit 76 encodes the picture with the resolution thereof being transformed to the predetermined resolution (or down-sampled).

A reference picture generated when encoding the picture with the resolution thereof being transformed to the predetermined resolution (or down-sampled) by the second encoding unit 76 may be stored in the second reference picture storage unit 77. Herein, the reference picture stored in the second reference picture storage unit 77 may have a second predetermined resolution.

Meanwhile, when the resolution transform decision unit 71 determines not to transform a resolution of a corresponding picture, the input picture of the input image is provided to the first encoding unit 72, and the first encoding unit 72 encodes the picture included in the input image.

A reference picture generate when encoding the picture included in the input image by the first encoding unit 72 may be stored in the first reference picture storage unit 73. Herein, the reference picture stored in the first reference picture storage unit 73 may have a first predetermined resolution.

Meanwhile, pictures included in the input image are not encoded in the same resolution. According to the decision of the resolution transform decision unit 71, a part of pictures included in the input image may be encoded by first encoding unit 72, and other pictures included in the input image may be encoded by second encoding unit 76.

Accordingly, a reference picture may not be present in the first reference picture storage unit 73 when the first encoding unit 72 performs encoding. Herein, the first encoding unit 72 request a corresponding picture to the second reference picture storage unit 77, and the corresponding picture may be stored in the first reference picture storage unit 73 through the up-sampling unit 78.

Similarly, a reference picture may not be present in the reference picture storage unit 77 when the second encoding unit 76 performs encoding. Herein, the second encoding unit 76 request a corresponding picture to the first reference picture storage unit 73, and the corresponding picture is stored in the second reference picture storage unit 77 through the down-sampling unit 74.

Meanwhile, first encoding unit 72 및 second encoding unit 76 may encode information indicate whether or not to transform a resolution which is provided form the resolution transform decision unit 71. Particularly, the information indicating whether or not to transform the resolution may be included in a field of a sequence parameter set, and a picture parameter set.

The information indicating whether or not to transform the resolution may include a resolution of the input image and a include of a encoding target picture.

The first encoding unit 72 and the second encoding unit 76 may process operations identical to the operation of the encoding unit 33 included in the image encoding apparatus according to the second embodiment of the present disclosure. Accordingly, detailed operations of the first encoding unit 72 and the second encoding unit 76 included in the fourth embodiment of the present disclosure will be performed with reference to the operation of the encoding unit 33 included in the image encoding apparatus according to the second embodiment of the present disclosure.

Figure 8:
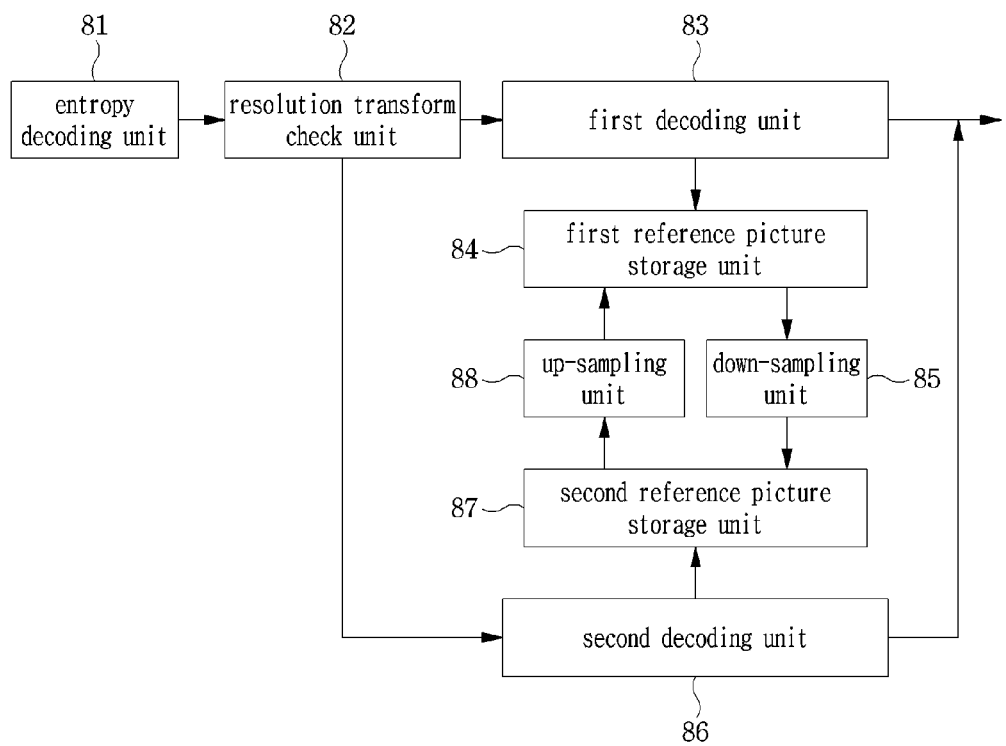
FIG. 8 is a block diagram showing a configuration of an image decoding apparatus according to a fourth embodiment of the present disclosure.

FIG. 8 is a block diagram showing a configuration of the image decoding apparatus according to the fourth embodiment of the present disclosure.

Referring to FIG. 8, the image decoding apparatus according to the fourth embodiment of the present disclosure may include an entropy decoding unit 81, a resolution transform check unit 82, a first decoding unit 83, a first reference picture storage unit 84, a down-sampling unit 85, a second decoding unit 86, a second reference picture storage unit 87, and an up-sampling unit 88.

Similar to the image decoding apparatus according to the first embodiment of the present disclosure, the entropy decoding unit 81 included in the image decoding apparatus according to the fourth embodiment of the present disclosure may perform entropy decoding in an opposite order of performing the entropy encoding in the entropy encoding unit of the image encoding apparatus. For example, in response to the method performed in the image encoding apparatus, various methods such as exponential golomb, context-adaptive variable length coding (CAVLC), context-adaptive binary arithmetic coding (CABAC), etc. may be used.

The image encoding apparatus may encode and store information indicating whether or not to transform a resolution. In response to this, the resolution transform check unit 82 may check information indicating whether or not to transform a resolution from entropy decoded data.

The information indicating whether or not to transform the resolution may be included in a field of a sequence parameter set, and a picture parameter set. The resolution transform check unit 82 may check information indicating whether or not to transform a resolution from the information included in the field of the sequence parameter set, or the picture parameter set.

The information indicating whether or not to transform the resolution may include a resolution of an input image and a resolution of an encoding target picture.

The resolution transform check unit 82 may provide entropy decoded bitstream based on the information indicating whether or not to transform the resolution to the first decoding unit 83, and the reconstructed image generation unit 65 or the second decoding unit 86.

For example, when the information indicating whether or not to transform the resolution indicates that the picture is not transformed with the resolution thereof, the resolution transform check unit 82 may provide the corresponding data to the first decoding unit 83. Alternatively, when the information indicating whether or not to transform the resolution indicates that the picture is transformed with the resolution thereof, the resolution transform check unit 82 may provide the corresponding data to the second decoding unit 86.

In response to this, the first decoding unit 83 and the second decoding unit 86 may decode the entropy decoded bitstream, and a reference picture stored in the first reference picture storage unit 84 or the second reference picture storage unit 87 when decoding.

Meanwhile, the encoded data may not be encoded in the same resolution, and may include encoded data of pictures encoded with resolutions different from each other.

Accordingly, a reference picture may not be present in the first reference picture storage unit 84 when decoding is performed by the first decoding unit 83. Herein, the first decoding unit 83 may request a corresponding picture to the second reference picture storage unit 87, and the corresponding picture may be stored in the first reference picture storage unit 84 through the up-sampling unit 88.

Similarly, a reference picture may not be present in second reference picture storage unit 87 when decoding is performed by second decoding unit 86. Herein, second decoding unit 86 may request a corresponding picture to the first reference picture storage unit 84, and the corresponding picture may be stored in the second reference picture storage unit 87 through the down-sampling unit.

Meanwhile, the first decoding unit 83 and the second decoding unit 86 may decode the entropy decoded bitstream.

The first decoding unit 83 and the second decoding unit 86 included in the fourth embodiment of the present disclosure may process, except for the operation of matching resolutions of the encoding target picture and the reference picture described above, operations identical to the decoding unit 43 included in the image decoding apparatus according to the second embodiment of the present disclosure. Accordingly, detailed operations of first decoding unit 83 and the second decoding unit 86 included in the fourth embodiment of the present disclosure will be performed with reference to the operation of the decoding unit 43 included in the image encoding apparatus according to the second embodiment of the present disclosure.

Figure 9:
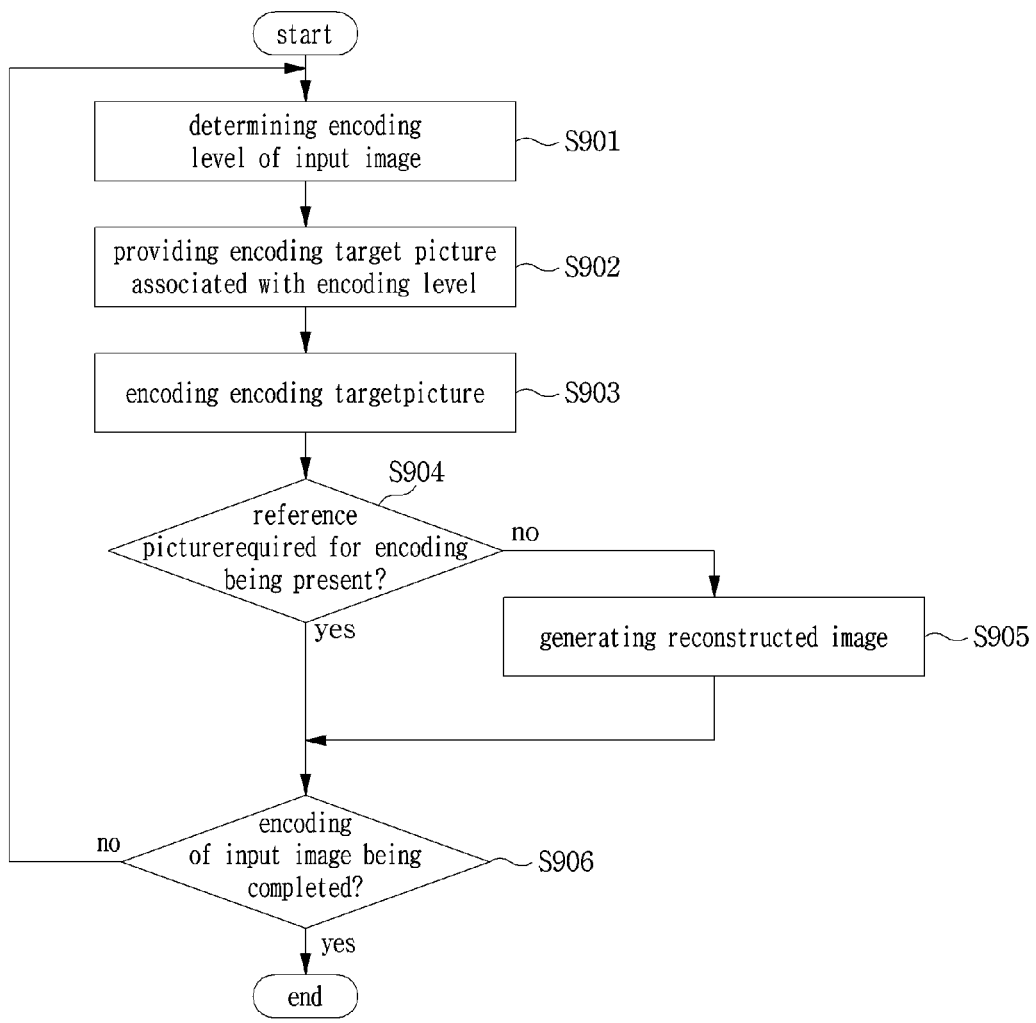
FIG. 9 is a flowchart showing a sequence of an image encoding method according to an embodiment of the present disclosure.

FIG. 9 is a flowchart showing a sequence of an image encode method according to an embodiment of the present disclosure.

The image encode method may be performed by the image encoding apparatus described above.

First, an input image may be configured with a preset frame rate and a preset resolution. In step S901, an encoding level may be determined by controlling the frame rate or resolution of the input image.

For example, the image encoding apparatus may determine whether or not to skip at least one frame among a plurality of frames that are temporally consecutive in the input image, or determine whether or not to skip a pixel positioned at each preset distance unit within a frame of the input image.

The image encoding apparatus may determine the encoding level of the input image based a quality of an image reconstructed from encoded data with the frame included in the input image being skipped, a similarity between frames included in the input image, a quality of an image reconstructed from encoded data in which a resolution of the input image is down-sampled, and a similarity between the image in which the resolution of the input image is down-sampled, and the input image.

The encoding level decision unit 11 may determine the encoding level of the input image based on the quality of the image reconstructed from encoded data with the frame included in the input image being skipped, the similarity between frames included in the input image, the quality of the image reconstructed from encoded data in which the resolution of the input image is down-sampled, and the similarity between the image in which the resolution of the input image is down-sampled, and the input image.

For example, the encoding level decision unit 11 may determine the encoding level by comparing the quality of the image reconstructed from encoded data with the frame included in the input image being skipped with a preset threshold value (quality threshold value), or by comparing the quality of the image reconstructed from encoded data in which the resolution of the input image is down-sampled with preset threshold value (quality threshold value).

In addition, as another example, the encoding level decision unit 11 may determine the encoding level by comparing the quality of the image reconstructed from encoded data with the frame included in the input image being skipped with a quality of an image reconstructed from encoded data of the input image, and by considering the quality that is relatively high.

Similarly, the encoding level decision unit 11 may determine the encoding level by comparing the quality of the image reconstructed from encoded data in which the resolution of the input image is down-sampled with the quality of the image reconstructed from encoded data of the input image, and by considering the quality that is relatively high.

In step S902, the image encoding apparatus may provide an encoding target picture based on information indicating the encoding level.

For example, when the information indicating the encoding level includes information indicating whether or not to skip at least one of a plurality of frames that are temporally consecutive, the image encoding apparatus may detect remaining frame, except for the skipped frame, and provide as the encoding target picture. In addition, when the information indicating the encoding level includes information in which a resolution of an image is changed into a preset unit, the image encoding apparatus may detect the image that is obtained by down-sampling the input image in the preset unit, and provide as the encoding target picture.

In step S903, the image encoding apparatus may encode the encoding target picture. For example, the image encoding apparatus may partition the encoding target picture into at least one process unit (for example, prediction unit (PU), transform unit (TU), coding unit (CU)), and perform operations such as inter-prediction, intra-prediction, transform, quantization, re-arrangement, entropy encoding of an image of the process unit.

In addition, image encoding apparatus may configure a reference picture by processing operations such as dequantization, reverse-transform, filtering, etc., store the reference picture in the reference picture storage unit 14, and use when encoding the encoding target picture according to the need.

The encoding target picture may include an image that is included in the input image, and with a predetermined frame skipped therein, or an image that is obtained by down-sampling a frame of the input image in the preset resolution. In addition, when encoding the encoding target picture by image encoding apparatus, pixel color information of a region that is not present due to the skipped frame or the down-sampling may be required. Accordingly, in step S905, the image encoding apparatus may generate a reconstructed image including the pixel color information of the region that is not present due to the skipped frame or the down-sampling, and store the generated reconstructed image in a picture buffer.

For example, an image obtained by duplicating an encoding target picture that is temporally adjacent to the skipped frame and which is previously encoded, a duplicated image obtained by considering a temporal relationship of at least two encoding target pictures that are temporally adjacent to the skipped frame, a down-sampled image on which the preset resolution is reflected, an up-sampled image on which the preset resolution is reflected, etc. may be generated as the reconstructed image by the image encoding apparatus In step S904, the generation of the reconstructed image may be selectively performed when a reference picture required for encoding is not present among reference pictures stored in the picture buffer.

Meanwhile, the image encoding apparatus may encode the information indicating the encoding level in step S903, the information indicating the encoding level may be included in a field of a sequence parameter set, and a picture parameter set The information indicating the encoding level may include whether or not a frame is skipped.

The information indicating the encoding level may include whether or not the image resolution is changed.

In addition, the information indicating the encoding level may include information indicating whether or not the frame is skipped, or whether or not the image resolution is changed.

When the information indicating the encoding level indicates whether or not the frame is skipped, the information indicating the encoding level may include information capable of predicting the skipped frame.

The information capable of predicting the skipped frame may include a frame rate of the input image and a frame rate of the encoding target picture.

When the information indicating the encoding level indicates whether or not the image resolution is changed, the information indicating the encoding level may include information capable of reconstructing the changed resolution.

The information capable of reconstructing the changed resolution may include resolution information of the input image, and resolution information of the encoding target picture.

Steps S901 to S905 described above may be repeatedly performed until encoding of all pictures included in the input image are completed.

FIG. 10 is a flowchart showing a sequence of an image decoding method according to an embodiment of the present disclosure.

First, in step S1001, an image decoding apparatus may perform entropy decoding in the opposite procedure to entropy encoding performed in the entropy encoding unit of the image encoding apparatus. For example, various methods such as exponential Golomb, context-adaptive variable length coding (CAVLC), context-adaptive binary arithmetic coding (CABAC) may be applied in response to a method performed in the image encoding apparatus.

In step S1002, the image decoding apparatus may check information indicating an encoding level from entropy decoded data.

The information indicating the encoding level may be included in a field of a sequence parameter set, and a picture parameter set, and the image decoding apparatus may check the information indicating the encoding level from information included in the field of the sequence parameter set, or the picture parameter set.

The image decoding apparatus may check whether or not the information indicating the encoding level indicates whether or not a frame is skipped.

Alternatively, the image decoding apparatus may check whether or not the information indicating the encoding level indicates whether or not an image resolution is changed.

Alternatively, the image decoding apparatus may check whether the information indicating the encoding level indicates whether or not a frame is skipped, or whether or not a frame is skipped.

Since the information indicating the encoding level indicates whether or not the frame is skipped. The image decoding apparatus may further check information capable of predicting the skipped frame. The image decoding apparatus may check a frame rate of the input image and a frame rate of the encoding target picture as the information capable of predicting the skipped frame.

Since the information indicating the encoding level indicates whether or not the image resolution is changed, the image decoding apparatus may check information capable of reconstructing the changed resolution.

The image decoding apparatus may check resolution information of the input image, and resolution information of the encoding target picture.

Then, in step S1003, the image decoding apparatus may decode the encoded data.

The encoded data is data obtained by encoding the encoding target picture, and the encoding target picture may include an image with a predetermined frame included in the input image being skipped, or an image obtained by down-sampling a frame of the input image in a preset resolution.

Accordingly, in response to the encoding level, the image decoding apparatus may generate a reconstructed image including pixel color information of a region that is not present due to the skipped frame or down-sampling.

For example, an image obtained by duplicating an encoding target picture that is temporally adjacent to the skipped frame and which is previously encoded, a duplicated image obtained by considering a temporal relationship of at least two encoding target pictures that are temporally adjacent to the skipped frame, a down-sampled image on which the preset resolution is reflected, an up-sampled image on which the preset resolution is reflected, etc. may be generated as the reconstructed image by the image decoding apparatus.

A method of generate the reconstructed image by the image decoding apparatus may be identical to the method of generating the reconstructed image by the image encoding apparatus. Accordingly, the method of generating the reconstructed image may be preset and stored, and may be included in the encoded data, for example, the information indicating the encoding level.

In step S1004, steps S1001 to S1003 described above may be repeatedly performed unit decoding of all encoded date is.

A data amount required for encoding a single frame when the frame is skipped is sufficient with a 1-bit for informing the frame skip and number of bits of additional information for reconstruct the frame, thus compression efficiency may be improved.

Similarly, when a spatial transform of down-sampling two times in each horizontal/vertical direction is applied, an original data amount is reduced to ¼, thus a size of the finally generated compressed bitstream may be further reduced.

Finally, the compression rate of video data may be improved by applying both techniques simultaneously to video encoding/decoding unit.

Although a preferred embodiment of the present invention has been described for illustrative purposes, those skilled in the art will appreciate that various modifications, additions and substitutions are possible, without departing from the scope and spirit of the invention as disclosed in the accompanying claims.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An image encoding apparatus comprising:
  an encoding level decision unit, configured to determine an encoding level of an input image respectively;
  a sampling unit, configured to construct an encoding target picture associated with the encoding level determined in the encoding level decision unit and output the encoding target picture;
  an encoding unit, configured to encode the encoding target picture output from the sampling unit; and
  a reconstructed image generation unit, configured to generate a first reconstructed image corresponding to the input image in association with the encoding level and at least one second reconstructed image corresponding to at least one pre-determined resolution; and
  a reference picture storage unit storing the first reconstructed image and the at least one second reconstructed image as a reference picture,
  wherein the encoding level decision unit determines whether or not to skip the input image and a spatial resolution transform of the input image by considering a quality of the first reconstructed image corresponding to the input image being encoded.

2. The apparatus of claim 1, wherein the encoding level decision unit comprises:

a frame skip decision unit configured to determine whether or not to skip the input image; and a resolution decision unit configured to determine a spatial resolution transform of the input image.

3. The apparatus of claim 1, wherein the reconstructed image generation unit is configured to generate the first reconstructed image corresponding to a skipped input image using at least one of an image obtained by duplicating a previous encoded input image, and a reconstruction image reconstructed by considering a temporal relationship between at least two previous encoded input images and the skipped input image.

4. The apparatus of claim 3, wherein the reconstructed image generation is configured to transform the resolution of the first reconstructed image to the at least one pre-determined resolution and generate the at least one second reconstructed image corresponding to the at least one pre-determined resolution.

5. The apparatus of claim 4, wherein the encoding unit comprises:
a first encoder configured to encode a first encoding target picture corresponding to an original resolution of the input image; and
a second encoder configured to encode a second encoding target picture obtained by down-sampling the input image to a pre-determined resolution.

6. The apparatus of claim 5, further comprising a reference picture storage unit, configured to store at least one reference picture, wherein the reference picture storage unit comprises:
a first reference picture storage unit configured to store a first reference picture corresponding to the original resolution of the first encoding target picture; and
a second reference picture storage unit configured to store at least one second reference picture corresponding to the at least one pre-determined resolution.

7. The apparatus of claim 6, wherein the reconstructed image generation unit comprises:
a down-sampling process unit configured to down-sample the first reference picture to the at least one pre-determined resolution, construct the at least one second reference picture down-sampled to the at least one pre-determined resolution, and provide the at least one second reference picture to the second reference picture storage unit; and
an up-sampling process unit configured to up-sample the at least one second reference picture to the original resolution of the input image, construct the first reference picture up-sampled to the original resolution, and provide the first reference picture to the first reference picture storage unit.

8. The apparatus of claim 1, wherein the sampling unit is configured to output the encoding target picture by down-sampling the input image to a pre-determined resolution or image skip information indicating whether or not to skip the input image.

9. The apparatus of claim 1, wherein the encoding unit is configured to encode information indicating the encoding level of the input image.

10. The apparatus of claim 9, wherein the information indicating the encoding level of the input image is included in at least one field of a sequence parameter set, and a picture parameter set.

11. An image decoding apparatus comprising:
an entropy decoding unit configured to reconstruct encoded image data from a bitstream;
an encoding level check unit configured to check an encoding level of the encoded image data;
a decoding unit configured to decode the encoded data, construct a decoded picture based on the encoded data, and construct an output image corresponding to an input image of an image encoding apparatus in association with the decoded picture and the encoded level of the decoded picture;
a reconstructed image generation unit configured to generate a first reconstructed image corresponding to the output image in association with the encoding level and at least one second reconstructed image corresponding to at least one pre-determined resolution, and
a reference picture storage unit configured to store first reconstructed image and the at least one second reconstructed image,
wherein the encoding level check unit checks whether or not input image is skipped and whether or not a spatial resolution of the input image is transformed.

12. The apparatus of claim 11, wherein the encoding level check unit comprises:
a frame skip check unit configured to check whether or not the input image is skipped; and
a resolution decision unit configured to check whether or not the spatial resolution of the input image is transformed.

13. The apparatus of claim 11, wherein the reconstructed image generation unit is configured to generate the first reconstructed image corresponding to a skipped input image using at least one of an image obtained by duplicating a previous output image, and a reconstructed image reconstructed by considering a temporal relationship between at least two previous output images and a skipped input image.

14. The apparatus of claim 13, wherein the reconstructed image generation unit is configured to transform the resolution of the first reconstructed image to at least one pre-determined resolution and generate the at least one second reconstructed image corresponding to the at least one pre-determined resolution.

15. The apparatus of claim 14, wherein the decoding unit comprises:
a first decoder configured to decode a first decoded picture corresponding to an original resolution of the input image;
a second decoder configured to decode a second decoded picture that is encoded by being down-sampled to a pre-determined resolution;
a first reference picture storage unit configured to store a first reference picture corresponding to the original resolution of the first decoded picture; and
a second reference picture storage unit configured to store at least one second reference picture including the second decoded picture of the pre-determined resolution and the at least one second reconstructed image transformed to the at least one pre-determined resolution.

16. The apparatus of claim 15, wherein the reconstructed image generation unit includes:
a down-sampling process unit configured to down-sample the first reference picture to the at least one pre-determined resolution, construct the at least one second reference picture down-sampled to the at least one pre-determined resolution, and provide the at least one second reference picture to the second reference picture storage unit; and
an up-sampling process unit configured to up-sample the at least one second reference picture to the original resolution of the input image, construct the first reference picture up-sampled to the original resolution, and provide the first reference picture to the first reference picture storage unit.

17. An image decoding method comprising:
reconstructing encoded image data from a bitstream;
checking an encoding level of the encoded image data;
decoding the encoded data;
constructing a decoded picture based on the encoded data;
constructing an output image corresponding to an input image of an image encoding apparatus in association with the decoded picture and the encoded level of the decoded picture;
generating a first reconstructed image corresponding to the output image and at least one second reconstructed image corresponding to at least one pre-determined resolution, and
storing first reconstructed image and the at least one second reconstructed image,
wherein checking an encoding level of the encoded image data comprises checking whether or not input image is skipped and checking whether or not a spatial resolution of the input image is transformed.

* * * * *